United States Patent
Sippel et al.

(10) Patent No.: US 11,149,576 B2
(45) Date of Patent: Oct. 19, 2021

(54) TURBINE SHROUD WITH CERAMIC MATRIX COMPOSITE SEAL SEGMENTS MOUNTED TO METALLIC CARRIERS

(71) Applicant: Rolls-Royce Corporation, Indianapolis, IN (US)

(72) Inventors: Aaron D. Sippel, Zionsville, IN (US); Daniel K. Vetters, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 182 days.

(21) Appl. No.: 16/521,117

(22) Filed: Jul. 24, 2019

(65) Prior Publication Data
US 2021/0025284 A1 Jan. 28, 2021

(51) Int. Cl.
*F01D 11/08* (2006.01)
*F01D 25/14* (2006.01)

(52) U.S. Cl.
CPC ............ *F01D 11/08* (2013.01); *F01D 25/145* (2013.01); *F05D 2230/60* (2013.01); *F05D 2240/11* (2013.01); *F05D 2240/14* (2013.01); *F05D 2240/15* (2013.01); *F05D 2260/201* (2013.01); *F05D 2260/31* (2013.01); *F05D 2300/6033* (2013.01)

(58) Field of Classification Search
CPC ...... F01D 11/08; F01D 25/145; F01D 25/246; F05D 2240/14; F05D 2240/11; F05D 2240/15
See application file for complete search history.

(56) References Cited

U.S. PATENT DOCUMENTS

| | | | |
|---|---|---|---|
| 4,087,199 A | 5/1978 | Hemsworth et al. | |
| 5,127,794 A * | 7/1992 | Burge | F01D 25/145 415/173.3 |
| 6,315,519 B1 | 11/2001 | Bagepalli et al. | |
| 8,647,055 B2 | 2/2014 | Foster et al. | |
| 8,740,552 B2 | 6/2014 | Marusko et al. | |
| 8,753,073 B2 | 6/2014 | Albers et al. | |
| 8,834,105 B2 | 9/2014 | Albers et al. | |
| 8,905,709 B2 * | 12/2014 | Dziech | F01D 11/125 415/173.1 |
| 9,726,043 B2 | 8/2017 | Franks et al. | |
| 10,047,624 B2 * | 8/2018 | O'Leary | F01D 25/12 |
| 10,087,784 B2 | 10/2018 | Shapiro et al. | |
| 10,184,352 B2 * | 1/2019 | O'Leary | F01D 9/02 |
| 10,385,718 B2 * | 8/2019 | O'Leary | F01D 11/24 |
| 10,641,120 B2 * | 5/2020 | Thomas | F02C 7/12 |
| 10,968,764 B2 | 4/2021 | Vetters et al. | |
| 2012/0082540 A1 * | 4/2012 | Dziech | F01D 11/005 415/173.1 |
| 2013/0004306 A1 | 1/2013 | Albers et al. | |
| 2014/0023490 A1 * | 1/2014 | Hillier | F01D 11/005 415/173.6 |
| 2016/0376901 A1 * | 12/2016 | O'Leary | F01D 9/02 415/116 |

(Continued)

*Primary Examiner* — Eldon T Brockman
(74) *Attorney, Agent, or Firm* — Barnes & Thornburg LLP (57) ABSTRACT

A turbine shroud assembly of a gas turbine engine includes a carrier, a blade track segment and a mounting assembly. The carrier is made from metallic materials. The blade track segment is made from ceramic matrix composite materials. The mounting assembly is configured to couple the blade track segment to the carrier.

19 Claims, 7 Drawing Sheets

(56) References Cited

U.S. PATENT DOCUMENTS

| | | | |
|---|---|---|---|
| 2016/0376921 A1* | 12/2016 | O'Leary | F01D 25/12 |
| | | | 415/116 |
| 2017/0022840 A1* | 1/2017 | Thomas | F01D 11/08 |
| 2017/0037740 A1* | 2/2017 | O'Leary | F01D 11/12 |
| 2017/0175572 A1* | 6/2017 | Vetters | F01D 25/12 |
| 2018/0149042 A1 | 5/2018 | Freeman et al. | |
| 2020/0025015 A1* | 1/2020 | O'Leary | F01D 11/24 |

* cited by examiner

TURBINE SHROUD WITH CERAMIC MATRIX COMPOSITE SEAL SEGMENTS MOUNTED TO METALLIC CARRIERS

FIELD OF THE DISCLOSURE

The present disclosure relates generally to gas turbine engines, and more specifically to shroud assemblies with ceramic matrix composite components that define a primary gas path through gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft, fan, or propeller. In some applications, shroud assemblies define flow paths to assist in guiding exhaust products through the turbine.

Some shroud assemblies includes ceramic matrix composite (CMC) components. CMC components can sometime withstand temperatures greater than comparable metallic components. However, mounting these CMC components to metallic components can present challenges.

SUMMARY

The present disclosure may comprise one or more of the following features and combinations thereof.

A turbine shroud segment adapted to extend part-way around a turbine wheel in a gas turbine engine may include a carrier, a blade track segment, and a mounting assembly. The carrier may be made from metallic materials and adapted to be coupled to a turbine case. The blade track segment may be made from ceramic matrix composite materials. The blade track segment may be shaped to include a runner that extends partway around a central reference axis to define in-part a primary gas path and an attachment feature that extends radially-outwardly from the runner. The mounting assembly may be configured to couple the blade track segment to the carrier.

In some embodiments, the mounting assembly may include at least one hanger and a heat shield. The at least one hanger may have a bracket that engages the attachment feature of the blade track segment and a shaft that extends through an aperture in the carrier. The heat shield may be coupled to the bracket of the hanger and have a shield panel arranged radially between the runner of the blade track segment and the bracket to resist the transmission of heat from the runner to the bracket.

In some embodiments, the mounting assembly may include a plurality of hangers. Each hanger may have a bracket that engages the attachment feature of the blade track segment and a shaft that extends through an aperture in the carrier. The shield panel of the heat shield may be arranged radially between the runner and the brackets of each of the plurality of hangers to resist the transmission of heat from the runner to the brackets of each of the plurality of hangers.

In some embodiments, the heat shield may include a plurality of attachment clips. The plurality of attachment clips extend from the heat shield to engage with the brackets of each of the plurality of hangers and couple the heat shield to the brackets of each of the plurality of hangers.

In some embodiments, the attachment feature of the blade track segment may be an attachment box. The attachment box may cooperate to define a cavity immediately outward of the runner in which the brackets of each of the plurality of hangers and the heat shield are arranged.

In some embodiments, the mounting assembly may include at least one nut. The at least one nut engages threads formed on the shaft of the hanger.

In some embodiments, the mounting assembly may include a plurality of hangers each having a bracket that engages the attachment feature of the blade track segment and a shaft that extends through an aperture in the carrier. The mounting assembly may include a plurality of nuts that each engage threads formed on the shaft of each of the hangers.

In some embodiments, the shield panel of the heat shield may be arranged radially between the runner and the brackets of each of the plurality of hangers to resist the transmission of heat from the runner to the brackets of each of the plurality of hangers. In some embodiments, the heat shield may include a plurality of attachment clips that extend from the heat shield to engage with the brackets of each of the plurality of hangers and couple the heat shield to the brackets of each of the plurality of hangers.

In some embodiments, the attachment feature of the blade track segment may be an attachment box. The attachment box may cooperate with the runner of the blade track segment to define a cavity immediately outward of the runner in which the bracket of the at least one hanger and the heat shield are arranged.

In some embodiments, the attachment box may include an axially-forward wall, an axially-aft wall, and a top wall. The top wall may interconnect the axially-forward wall and the axially-aft wall at a location spaced radially from the runner of the blade track segment so that the attachment box creates a U-shape when viewed in the circumferential direction around the central reference axis.

In some embodiments, the mounting assembly may include a plurality of hangers. The plurality of hangers each having a bracket arranged in the cavity that engages the attachment box of the blade track segment and a shaft that extends through the top wall of the attachment box and through the carrier.

In some embodiments, the shield panel of the heat shield may be arranged radially between the runner and the brackets of each of the plurality of hangers to resist the transmission of heat from the runner to the brackets of each of the plurality of hangers. In some embodiments, the mounting assembly may include a plurality of nuts that each engage threads formed on the shaft of each of the hangers.

In some embodiments, the bracket of each of the plurality of hangers may extend axially forward and aft of the shaft such that the bracket and the shaft of each hanger cooperate to provide a T-shape when viewed in the circumferential direction around the central reference axis.

In some embodiments, the shaft of each of the plurality of hangers is shaped to include a cooling impingement hole. The cooling impingement hole may extend radially through the shaft. The cooling impingement hole may also be configured to provide a flow of cooling air to the blade track segment.

According to another aspect of the disclosure, a turbine shroud segment adapted to extend part-way around a turbine wheel in a gas turbine engine may include a carrier, a blade track segment, and a mounting assembly. The carrier may be made from metallic materials and may be adapted to be coupled to a turbine case. The blade track segment may be made from ceramic matrix composite materials. The mounting assembly may be configured to couple the blade track segment to the carrier.

In some embodiments, the blade track segment may be shaped to include a runner and an attachment box. The runner may extend partway around a central reference axis to define in-part a primary gas path. The attachment box may extend radially-outwardly from the runner and cooperate to define a cavity immediately outward of the runner.

In some embodiments, the mounting assembly may include a first hanger and a second hanger. The second hanger may be spaced apart circumferentially from the first hanger.

In some embodiments, each of the first hanger and the second hanger may include a bracket and a shaft. The bracket may be arranged in the cavity of the blade track segment and may engage the attachment box of the blade track segment. The shaft may extend radially outward from the bracket through an aperture in the carrier. In some embodiments, the bracket and the shaft may be separate components that are assembled to form a two-piece hanger component.

In some embodiments, the mounting assembly may further include a heat shield. The heat shield may be coupled to both brackets of the first hanger and the second hanger to block removal of the first hanger and the second hanger outer of the cavity of the blade track segment.

In some embodiments, the heat shield may include a shield panel, a first attachment clip, and a second attachment clip. The shield panel may be arranged radially between the runner of the blade track segment and the brackets of both the first hanger and the second hanger. The first attachment clip may extend from the shield panel to engage with the bracket of the first hanger and couple the heat shield to the bracket of the first hanger. The second attachment clip may extend from the shield panel to engage with the bracket of the second hanger and couple the heat shield to the bracket of the second hanger.

In some embodiments, the attachment box may be shaped to include a circumferentially-extending hanger slot. The circumferentially-extending hanger slot may extend circumferentially partway about the central reference axis. In some embodiments, the bracket of each hanger may extend axially within the cavity of the black track segment to engage the attachment box and block radially inward movement of the blade track segment relative to the carrier.

In some embodiments, the shaft of each hanger may be shaped to include a cooling impingement hole. The cooling impingement hole may extend radially through the shaft. The cooling impingement hole may be configured to provide a flow of cooling air to the runner of the blade track segment.

According to another aspect of the disclosure, a turbine section adapted for use in a gas turbine engine may include a turbine case, a turbine wheel, and a turbine shroud. The turbine case extends around a central reference axis. The turbine wheel is mounted in the turbine case for rotation about the central reference axis. The turbine wheel may include turbine blades shaped to interact with hot gasses as they expand along a primary gas path so as to cause rotation of the turbine wheel about the central reference axis. The turbine shroud provides a ring around the turbine wheel that defines the primary gas path to discourage movement of gasses past the turbine wheel without interacting with turbine blades of the turbine wheel.

The turbine shroud may be made up of turbine shroud segments that each include a carrier, a blade track segment, and a mounting assembly. The carrier may be made from metallic materials that is coupled to the turbine case. The blade track segment may be made from ceramic matrix composite materials. The blade track segment may be shaped to include a runner that extends partway around a central reference axis to define in-part a primary gas path and an attachment box that extends radially-outwardly from the runner to define a cavity therebetween.

The mounting assembly may include at least one hanger and a heat shield. The at least one hanger may have a bracket that engages the attachment feature of the blade track segment and a shaft that extends through an aperture in the carrier. The heat shield may be coupled to the bracket of the hanger. The heat shield may have a shield panel arranged radially between the runner of the blade track segment and the bracket to resist the transmission of heat from the runner to the bracket.

In some embodiments, the attachment box may include an axially-forward wall, an axially-aft wall, and a top wall. The top wall may interconnect the axially-forward wall and the axially-aft wall at a location spaced radially from the runner of the blade track segment so that the attachment box creates a U-shape when viewed in the circumferential direction around the central reference axis.

In some embodiments, the mounting assembly may include a plurality of hangers. Each of the plurality of hangers may have a bracket arranged in the cavity that engages the attachment box of the blade track segment and a shaft that extends through the attachment box and the carrier. In some embodiments, the shield panel of the heat shield may be arranged radially between the runner and the brackets of each of the plurality of hangers to resist the transmission of heat from the runner to the brackets of each of the plurality of hangers.

According to an aspect of the disclosure, a method of assembling a turbine shroud segment may include a number of steps. The method may includes providing a carrier segment that is shaped to define an attachment-receiving space, providing a blade track segment that includes a runner that extends partway around a central reference axis and an attachment box that extends radially-outwardly from the runner to define a cavity immediately outward of the runner, providing a mounting assembly that includes (i) at least one hanger with a bracket and a shaft that extends radially outward from the bracket, (ii) a heat shield having a shield panel and an attachment clip configured to couple to the at least one hanger, and (iii) a nut configured to couple to the shaft of the at least one hanger, aligning the bracket of the at least one hanger with a circumferentially-extending hanger slot formed in the attachment box of the blade track segment by orientating the bracket such that the bracket extends circumferentially and parallel with the circumferentially-extending hanger slot, inserting the bracket of the at least one hanger through the circumferentially-extending hanger slot into the cavity of the blade track segment such that the bracket is located in the cavity and a threaded portion of the shaft extends radially outward of the attachment box, rotating the at least one hanger 90 degrees within the cavity so that the bracket extends axially and perpendicular to the circumferentially-extending slot and engages the attachment box to block removal the at least one hanger out of the cavity, inserting the heat shield into the cavity from one of a first or second circumferential opening on either circumferential side of the blade track segment so that the shield panel of the heat shield is arranged radially between the bracket of the at least one hanger and the runner of the blade track segment, attaching the heat shield to the at least one hanger by pushing the hanger radially inward into engagement with the attachment clip so that the attachment clip couples to the bracket of the at least one hanger, positioning the attachment box of the blade track segment in the attachment-receiving space of the carrier segment such that the shaft of the at least one hanger extends through an aperture formed in the carrier segment, and attaching the nut to the threaded portion of the shaft radially outward of the attachment box so as to couple the blade track segment to the carrier segment.

These and other features of the present disclosure will become more apparent from the following description of the illustrative embodiments.

BRIEF DESCRIPTION OF THE DRAWINGS

FIG. 7 is a diagrammatic view of a turbine shroud assembly process showing the process includes (i) inserting each of the hangers through a circumferential hanger slot formed in the blade track segment and into the cooling cavity, (ii) rotating each hanger arranged in the cooling cavity so that the hanger engages the blade track segment, (iii) inserting the hanger heat shield into the cooling cavity, (iv) arranging the hanger heat shield within the cooling cavity so that the attachment clips align with the corresponding hangers, (v) coupling the hanger heat shield to the hangers by pressing the hangers radially outward so that the attachment clips engage the hanger, (vi) arranging the blade track segment with the mounting assembly in a cavity formed in the carrier so that the hangers extend radially outward through holes formed in the carrier, and (vii) fastening the fastener nuts onto a portion of the hangers extending radially outward of the carrier to couple the blade track segment to the carrier;

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
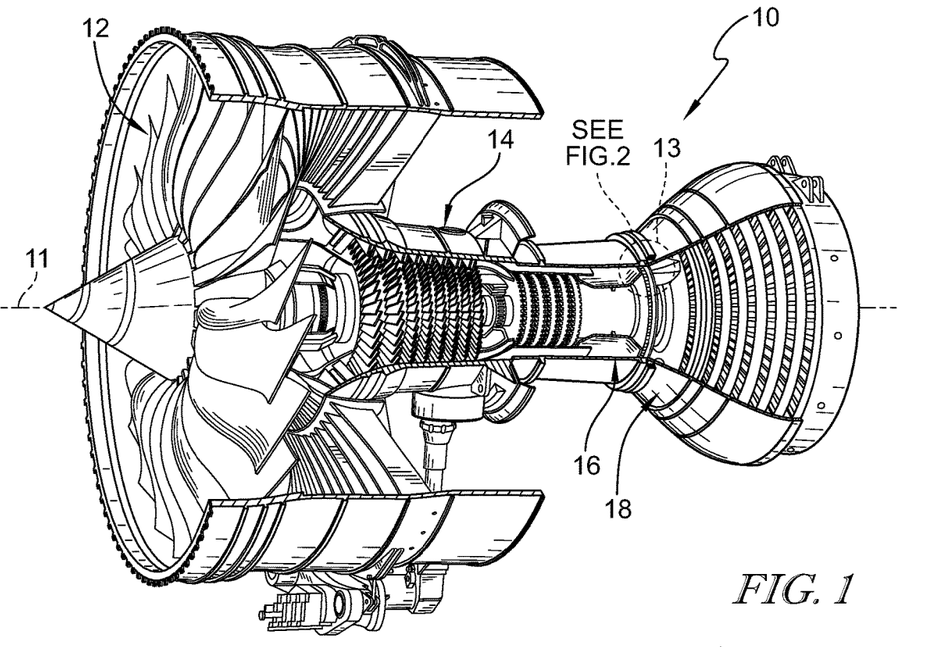
FIG. 1 is an perspective view of a gas turbine engine having a portion cut away to show that the gas turbine engine includes a fan, a compressor, a combustor, and a turbine section.
Figure 2:
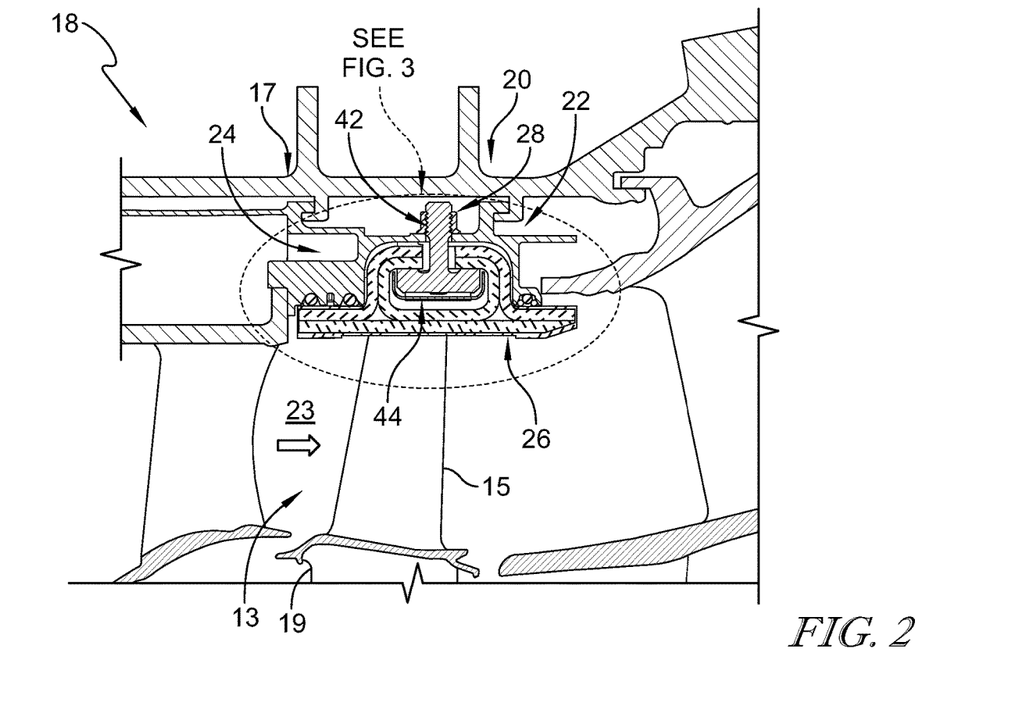
FIG. 2 is a sectional view of a portion of the gas turbine engine of FIG. 1 in cross-section about a central axis showing that the turbine section includes a turbine shroud in accordance with the present disclosure positioned radially outward from blades of a turbine wheel assembly, and showing that the turbine shroud assembly includes (i) a carrier made from metallic materials coupled to an outer case of the turbine section, (ii) a blade track segment comprising ceramic matrix composite (CMC) materials, and (iii) a mounting assembly configured to couple the CMC blade track segment to the metallic carrier.

A turbine shroud assembly 22 according to the present disclosure is adapted for use in a gas turbine engine 10 as suggested in FIGS. 1 and 2. The gas turbine engine 10 includes a fan 12, a compressor 14, a combustor 16, and a turbine section 18 as suggested in FIG. 1. The fan 12 is driven by the turbine section 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine section 18 to cause components of the turbine section 18 to rotate about a central axis 11 and drive the compressor 14 and the fan 12.

The turbine section 18 includes at least one turbine wheel assembly 13 and a turbine shroud 20 positioned to surround the turbine wheel assembly 13 as shown in FIGS. 1 and 2. The turbine wheel assembly 13 includes a plurality of blades 15 coupled to a rotor disk 19 for rotation therewith. The hot, high pressure combustion products from the combustor 16 are directed toward the blades 15 of the turbine wheel assemblies 13 along a flow path 23. The turbine shroud 20 is coupled to an outer case 17 of the gas turbine engine 10 and extends around the turbine wheel assembly 13 to block gases from passing over the turbine blades 15 during use of the turbine section 18 in the gas turbine engine 10.

In the illustrative embodiment, the turbine shroud 20 is made up of a number of turbine shroud assemblies 22 that each extend only part-way around the central axis 11 and cooperate to surround the turbine wheel assembly 13. In other embodiments, the turbine shroud 20 is annular and non-segmented to extend fully around the central axis 11 and surround the turbine wheel assembly 13. In yet other embodiments, certain components of the turbine shroud 20 are segmented while other components are annular and non-segmented.

Each shroud segment 22 includes a carrier 24, a blade track segment 26, and a mounting assembly 28 as shown in FIGS. 2-8. The carrier 24 is a metallic component supported by the outer casing 17 and is configured to support the blade track segment 26 in position adjacent to the blades 15 of the turbine wheel assembly 13. The blade track segment 26 comprises ceramic matrix composite materials and is arranged radially outward of the blades 15. The mounting assembly 28 is configured to couple the blade track segment 26 to the carrier 24 and hold the blade track segment 26 in place such that the blade track segment 26 is properly located.

Ceramic matrix composite materials can generally withstand higher temperatures than current metallic materials. Therefore, the ceramic matrix composite blade track segment 26 may allow for increased temperatures within the turbine section 18 as well as decreased cooling air usage such that the overall efficiency of the gas turbine engine 10 can be improved. However, ceramic matrix composite materials may have a relatively low strength compared to the surrounding support structures such as the metallic carrier 24. Additionally, the ceramic matrix composite materials of the segment 26 and the metallic materials of the carrier 24 grow and shrink at different rates when exposed to high/low temperatures due to the differing coefficients of thermal expansion of the materials. To accommodate these differences in structural strength and thermal growth, the mounting assembly arrangement couples the blade track segment 26 to the carrier 24 while also allowing for simplified cooling of the blade track segment 26 improving the performance of the engine 10.

The blade track segment 26 includes a runner 30 and an attachment feature 32 as shown in FIGS. 3-5 and 6-8. The runner 30 extends partway around the central reference axis 11 and forms a flow surface 31 to guide the combustion products to engage the blades 15 through the turbine section 18. The attachment feature 32 extends radially-outwardly from and circumferentially along the runner 30. In the illustrative embodiment, the attachment feature 32 is an attachment box 32 that cooperates with the runner 30 to define a cavity 34 immediately outward of the runner 30 in which a portion of the mounting assembly 28 is arranged.

The attachment box 32 includes an axially-forward wall 36, an axially-aft wall 37, and a top wall 38 as shown in FIGS. 3-6. The axially-aft wall 37 is spaced axially aft of the axially-forward wall 36 relative to the central axis 11. The top wall 38 extends between and interconnects the axially-forward and axially-aft walls 36, 37 at a location radially outward from the runner 30 of the blade track segment 26. The arrangement of the walls 36, 37, 38 of the attachment box 32 creates a radially inwardly opening or upside down U-shape when viewed in the circumferential direction around the central axis 11.

The U-shape of the attachment box may reduce the bending stresses of the blade track segment 26, yet the U-shape may also lead to an increase in thermal stress of the blade track segment 26. To address these thermal stresses, the top wall 38 of the attachment box 32 is shaped to include a circumferentially-extending hanger slot 40 as shown in FIGS. 3 and 5-8. The circumferentially-extending hanger slot 40 allows for the installation of the mounting assembly 28 into the cavity 34, while also allowing a flow of cooling air to be supplied to the cavity 34 to cool the blade track segment 26.

The mounting assembly 28 includes at least one hanger 42 and a heat shield 44 as shown in FIGS. 3-7. The hanger 42 comprising a first metallic material extends radially inward from the carrier 24 and engages the attachment box 32 of the blade track segment 26 in the cavity 34 to block radially inward movement of the blade track segment 26 relative to the carrier 24. The heat shield 44 comprising a second metallic material is coupled to the hanger 42 to block removal of the hanger 42 out of the cavity 34. The heat shield 44 is also coupled to the hanger 42 radially between the hanger 42 and the blade track segment 26 to resist the transmission of heat from the runner 30 to the hanger.

During use of the gas turbine engine 10, the ceramic matrix composite material of the blade track segment 26 heats up due to the high temperature gases passing over the flow surface 31 of the blade track segment 26 causing a temperature difference between the blade track segment 26 and the hanger 42. As such, the runner 30 the blade track segment 26 radiates heat to an inner surface 43 of the hanger 42 that is spaced radially outward and in confronting relation to the runner 30. The heat shield 44 is arranged radially between the runner 30 and the inner surface 43 of each hanger 42 of the hanger 42 to reduce the amount of radiant heat transferred to the hangers 36 from the radiant heating caused by this temperature difference.

In the illustrative embodiments, the heat shield 44 is an integral sheet of metal having a uniform thickness. The second metallic material of the heat shield 44 may be different from the first metallic material of the hangers 42 in some embodiments. In other embodiments, the hangers 42 and the heat shield 44 may be made of the same material.

In some embodiments, the heat shield 44 may be bent or stamped to form the desired shape of the heat shield 44. In the illustrative embodiment, the heat shield 44 is a two piece component and assembled together to form the heat shield 44.

The hanger 42 includes a bracket 46 and a shaft 48 as shown in FIGS. 3-6. The bracket 46 engages the attachment box 32 of the blade track segment 26. The shaft 48 extends radially outward from the bracket 46 such that the bracket 46 forms a T-shaped cross-sectional shape when viewed circumferentially along the blade track segment 26. The shaft 48 extends radially through the circumferentially-extending hanger slot 40 and an aperture 93 in the carrier 24. In the illustrative embodiment, the shaft 48 is threaded 49 and a fastener nut 45 included in the mounting assembly 28 engages the threaded portion 49 of the shaft 48 to couple the hanger 42 to the carrier 24.

In the illustrative embodiment, the bracket 46 and the shaft 48 of the hanger 42 are a single piece component. In some embodiments, the bracket 46 and the shaft 46 may be separate components and assembled to form the hanger 42 of the mounting assembly 28.

Figure 5:
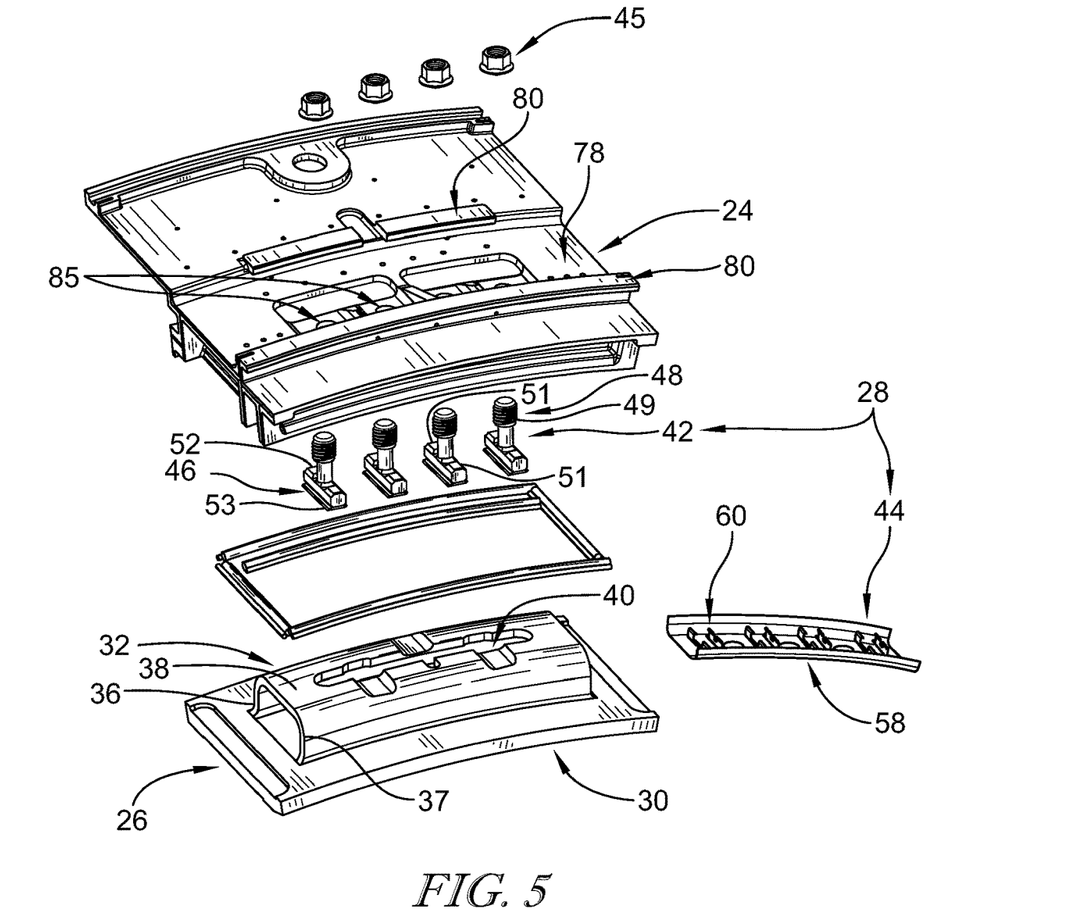
FIG. 5 is an exploded view of the shroud assembly of FIG. 2 showing that turbine shroud assembly further includes seal members arranged between the blade track segment and the carrier to seal between the components, and showing the seal members include a perimeter seal that extends around a perimeter of the blade track segment and a separating seal that extend between the circumferential ends of the perimeter seal to form an additional seal channel at a forward edge of the blade track segment.

In the illustrative embodiment, the mounting assembly 28 includes a plurality of hangers 42 and a plurality of fastener nuts 45 that are arranged to support the single blade track segment 26 as shown in FIG. 5. The plurality of hangers 42 are circumferentially spaced circumferentially apart about the axis 11 and each engage the attachment box 32 of the blade track segment 26 to distribute contact loads along a circumferential length of the attachment box 32. The plurality of fastener nuts 45 each engage the threads 49 formed on the shaft 48 of each of the hangers 42.

As such, the heat shield 44 is also configured to be an assembly aid by holding the plurality of hangers 42 in the proper position prior to attaching each of the nuts 45. The heat shield 44 is also configured to be an assembly aid by resisting the nut torque and maintaining the proper orientation of the hangers 42 while the nuts 45 are torqued. The heat shield 44 is also configured to manage failure or structural damage of the shroud segment 22 if one of the shafts 48 fails or one of the nuts 45 backs off. The heat shield is configured to hold the loose or broken piece in place, preventing the failed component from damaging the backside of the runner 30 of the ceramic matrix composite blade track segment 26.

Figure 3:
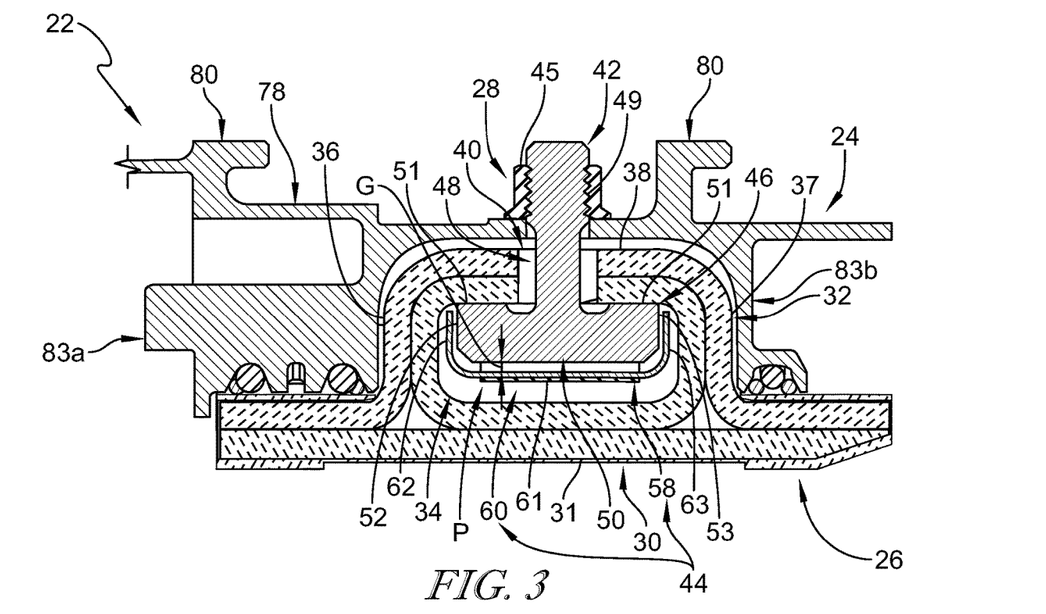
FIG. 3 is a detail view of the shroud assembly of FIG. 2 showing the mounting assembly includes (a) a hanger arranged in a cooling cavity formed by the blade track segment that extends radially outward to the carrier to couple the blade track segment to the carrier and (b) a heat shield arranged in the cooling cavity that couples to the hanger to protect the hanger within the cooling cavity.
Figure 6:
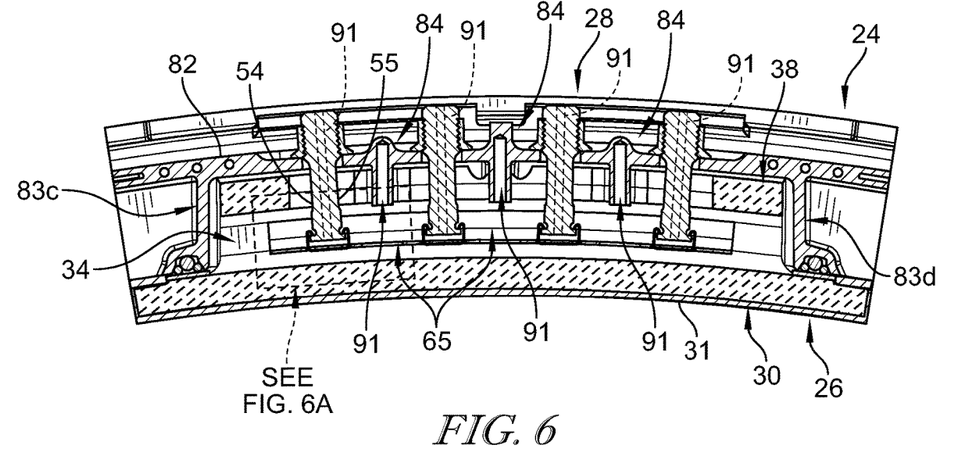
FIG. 6 is a cross-sectional view of the shroud assembly of FIG. 3 taken along line 6-6 showing that the shield panel of the heat shield is arranged between the blade track segment and the hangers in the cooling cavity, showing that the plurality of attachment clips are spaced circumferentially apart about the axis and extend radially outward from the shield panel and engage one of the hangers to couple the heat shield to the plurality of hangers, and showing that the carrier includes a plurality of cooling impingement holes that extend radially through the carrier and transmit a flow of cooling air into the cooling cavity toward the heat shield.

The bracket 46 of each hanger 42 includes a bracket body 50 and load pads 51 as shown in FIGS. 3, 5, and 6. The bracket body 50 has a forward end 52 and an aft end 53 spaced axially aft of the forward end 52 to define an axial length of the bracket 46. At least one load pad 51 extends from one of the forward end 52 and axial end 53 radially outward and engages the top wall 38 of the attachment box 32.

Figure 6A:
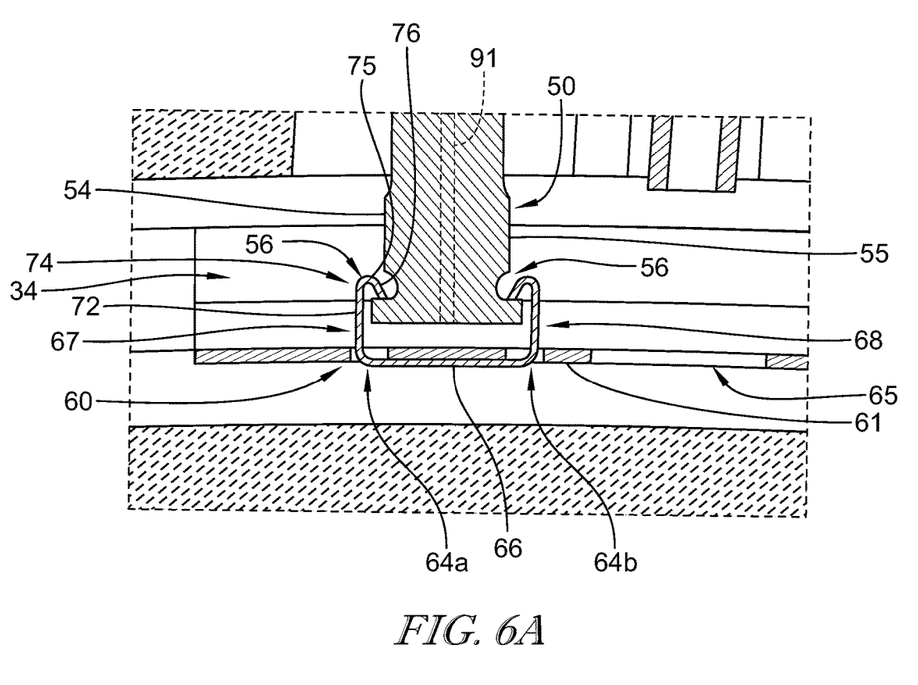
FIG. 6A is a detail view of the shroud assembly of FIG. 7 showing that each of the attachment clips includes a clip base panel arranged between a runner of the blade track segment and the shield panel of the heat shield, a first clip arm that extends radially outward from the clip base panel through a first clip slot formed in the shield panel, and a second clip arm that extends radially outward from the clip base panel through a second clip slot formed in the shield panel.

The bracket body 50 of each bracket 46 has a first circumferential side 54 and a second circumferential side 55 as shown in FIGS. 6 and 6A. The second circumferential side 55 is spaced circumferentially from the first circumferential side 54. The first and second sides 54, 55 extend between and interconnect the forward end 52 and the aft end 53. Each side 54, 55 is shaped to include a clip notch 56 that extends into the side 54, 55 of the bracket 46 for maintaining attachment of the heat shield 44.

The heat shield 44 includes a shield panel 58 and a plurality of attachment clips 60 as shown in FIGS. 3-7. The shield panel 58 is arranged radially between the runner 30 of the blade track segment 26 and the bracket 46 to resist the transmission of heat from the runner 30 to the bracket 46. Each clip 60 of the plurality of attachment clips 60 extends from the shield panel 58 of the heat shield 44 to the brackets 46 of each of the plurality of hangers 42. In the illustrative embodiment, the attachment clips 60 engage each of the clip notches 56 on the sides 54, 55 of the bracket 46 to couple the heat shield 44 to the hangers 42.

In the illustrative embodiment, the shield panel 58 and the attachment clips 60 are two separate components that are assembled to form the heat shield 44. In other embodiments, the shield panel 58 and the attachment clips 60 may be a single piece component that is stamped or bent to form the desired shape of the heat shield 44.

Figure 5A:
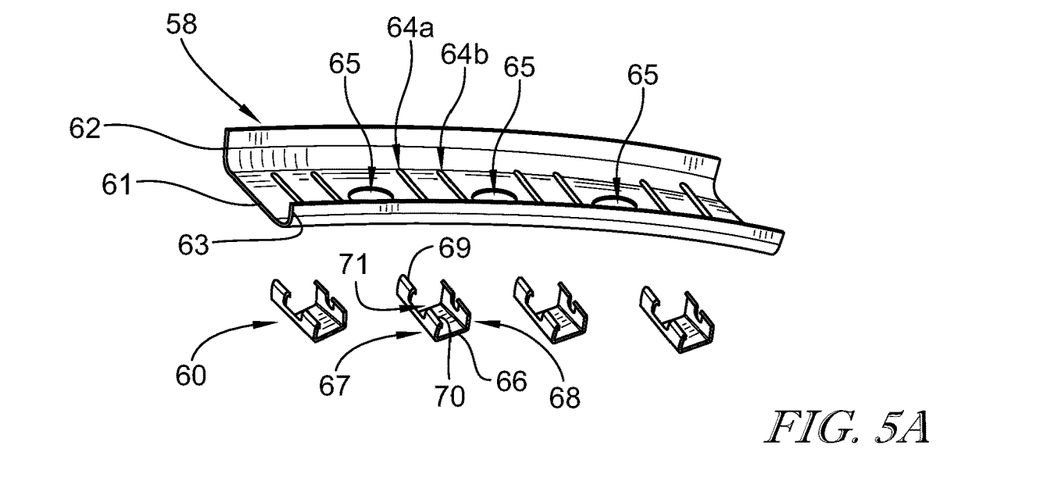
FIG. 5A is an exploded view of the heat shield included in the shroud assembly of FIG. 5 showing the heat shield includes a shield panel that extends circumferentially partway about the axis and a plurality of attachment clips that each extend through clip slots formed in the shield panel and couple to the corresponding hanger.

The shield panel 58 includes a flat base panel 61, a first fillet edge 62, and a second filet edge 63 as shown in FIGS. 3, 5A, and 6A. The flat base panel 61 is arranged between the runner 30 of the blade track segment 26 and each of the hangers 42. The flat base panel 61 is radially spaced apart from the inner surface 43 of the hanger 42 to form a gap G therebetween. The first fillet edge 62 extends from the flat base panel 61 radially outward and around the forward end 52 of the bracket 46 without engaging the bracket 46. The second filled edge 63 extends from the flat base panel 61 radially outward and around the aft end 53 of the bracket 46 without engaging the bracket 46.

The gap G between the hangers 42 and the shield panel 58 of the heat shield 44 helps minimize the conductive heat transfer to the hangers 42. In the illustrative embodiment, the shield panel 48 does not engage or contact the bracket 46 of the hanger 44 further minimizing the heat transferred to the hangers 42.

The flat base panel 61 is shaped to include a plurality of clip slots 64a, 64b and cooling apertures 65 as shown in FIGS. 5A and 6A. Each of the clip slots 64a, 64b extend radially through the flat base panel 61 and extend axially from the first fillet edge 62 to the second fillet edge 63. The clip slots 64a, 64b are circumferentially spaced apart in pairs of two so that two adjacent clip slots 64a, 64b receive one attachment clip 60 of the plurality of attachment clips 60. The cooling apertures 65 extend radially through the flat base panel 61 and are circumferentially spaced between every other pair of clip slots 64a, 64b.

Each of the attachment clips 60 are shaped to include a clip base panel 66, a first clip arm 67, and a second clip arm 68 as shown in FIGS. 5A and 6A. The clip base panel 66 is arranged between the runner 30 of the blade track segment 26 and the shield panel 58. The first clip arm 67 extends radially outward from the clip base panel 66 through a first clip slot 64a and engages the first side 54 of the bracket 46 in the clip notch 56 formed in the first side 54. The second clip arm 68 is spaced circumferentially from the first clip arm 67. The second clip arm 68 extends radially outward from the clip base panel 66 through a second clip slot 64b and engages the second side 55 of the bracket 46 in the clip notch 56 formed in the second side 55. The first and second clip arms 67, 68 engage the clip notches 56 to couple the shield panel 58 to the plurality of hangers 42 while maintaining the gap G between the shield panel 58 and the inner surface 43 of the hangers 42.

In the illustrative embodiment, each of the first clip arm 67 and the second clip arm 68 include a forward clip-arm portion 69 and an aft clip-arm portion 70 as shown in FIG. 5A. The aft clip-arm portion 70 is spaced axially aft of the forward clip-arm portion 69 so that a space 71 is between the forward and aft clip-arm portions 69, 70. The forward and aft clip-arm portions 69, 70 of both the first and second clip arms 67, 68 establishes four points of engagement with the bracket 46. In other embodiments, the first and second clip arms 67, 68 may extend the axial length of the bracket 46.

Each of the clip arms 67, 68 includes a radially-extending portion 72 and a clip head 74 as shown in FIGS. 5A and 6A. The radially-extending portion 72 extends radially outward from the clip base panel 66 through the clip slot 64a, 64b of the shield panel 58. The clip head 74 extends from the radially-extending portion 72 and engages the clip notch 56 formed in one of the first side 54 and second side 55 of the bracket 46.

The clip head 74 includes a curved portion 75 and a flexible lip portion 76 as shown in FIG. 6A The curved portion 75 extends from the radially-extending portion 72. The flexible lip portion 76 extends from the curved portion 75 and engages the clip notch 56 of the bracket 46. The curved portion 75 has a curved shape that biases the flexible lip portion 76 into engagement with the bracket 46 to maintain attachment of the attachment clips 60 to each of the hangers 42.

In the illustrative embodiment, a portion of the mounting assembly 28 is configured to bias the shield panel 58 towards the runner 30. In some embodiments, the clip arms 67, 68 may be sized to maintain the gap G between the heat shield 44 and the runner 30. In other embodiments, the hangers 42 may be shaped to form small protrusions from the inner surface 43 of the bracket 46 that set the gap G. In other embodiments, A portion of the heat shield 44 may contact the top wall 38 of the box 32 as the nuts 45 are tightened, etc.

Turning again to the carrier 24, the carrier 24 includes a body 78 and case hangers 80 as shown in FIGS. 3-5 and 8. The body 74 is formed to define an attachment-receiving space 79. The case hangers 80 extend radially outward from the body 78 and engage the outer casing 17 of the gas turbine engine 10 to couple the carrier 24 to the case 17.

The body 78 includes a mount plate 82, receiving walls 83a, 83b, 83c, 83d that extend radially inward from the mount plate 82, and anti-rotation features 84, 86 as shown in FIGS. 3, 4, 6, and 8. The mount plate and receiving walls cooperate to define the attachment-receiving space 79, which receives the attachment box 32 of the blade track segment 26. The anti-rotation features 84, 86 extend radially inward from the mount plate 82 into the attachment-receiving space 79 to engage corresponding features 92, 94 formed in the attachment box 32 of the blade track segment 26 to block rotation of the blade track segment 26 around the axis 11 within the attachment-receiving space 79.

Figure 4:
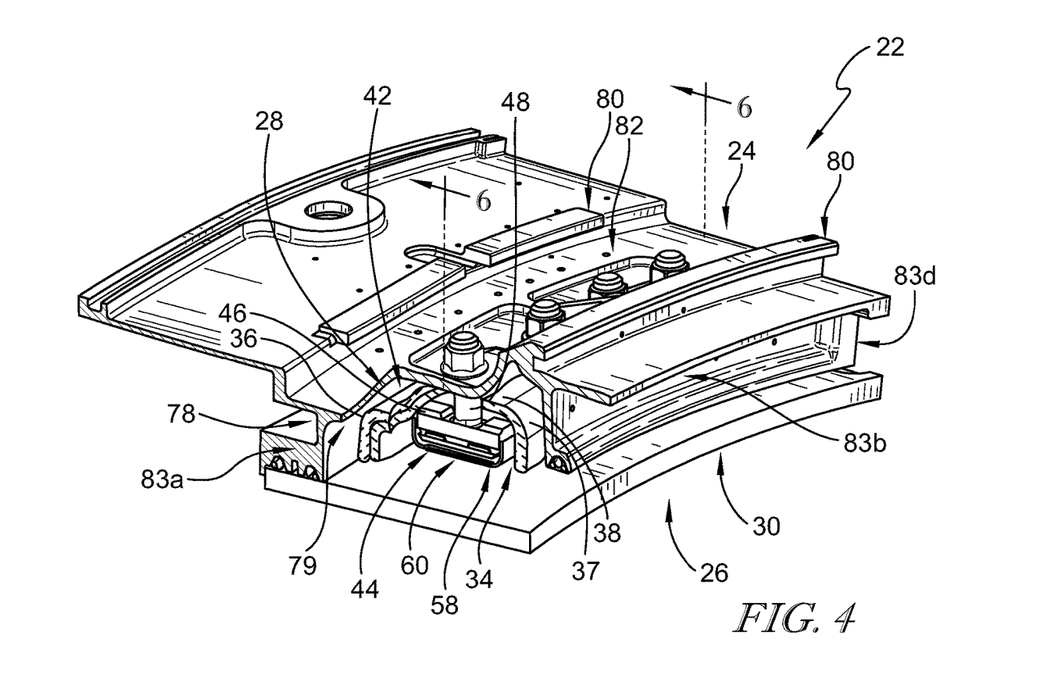
FIG. 4 is a cutaway perspective view of the shroud assembly of FIG. 2 showing a plurality of hangers are configured to support the blade track segment, and showing that the hangers are bolted to the carrier with fastener nuts included in the mount assembly to selectively couple the plurality of hangers to the carrier.
Figure 8:
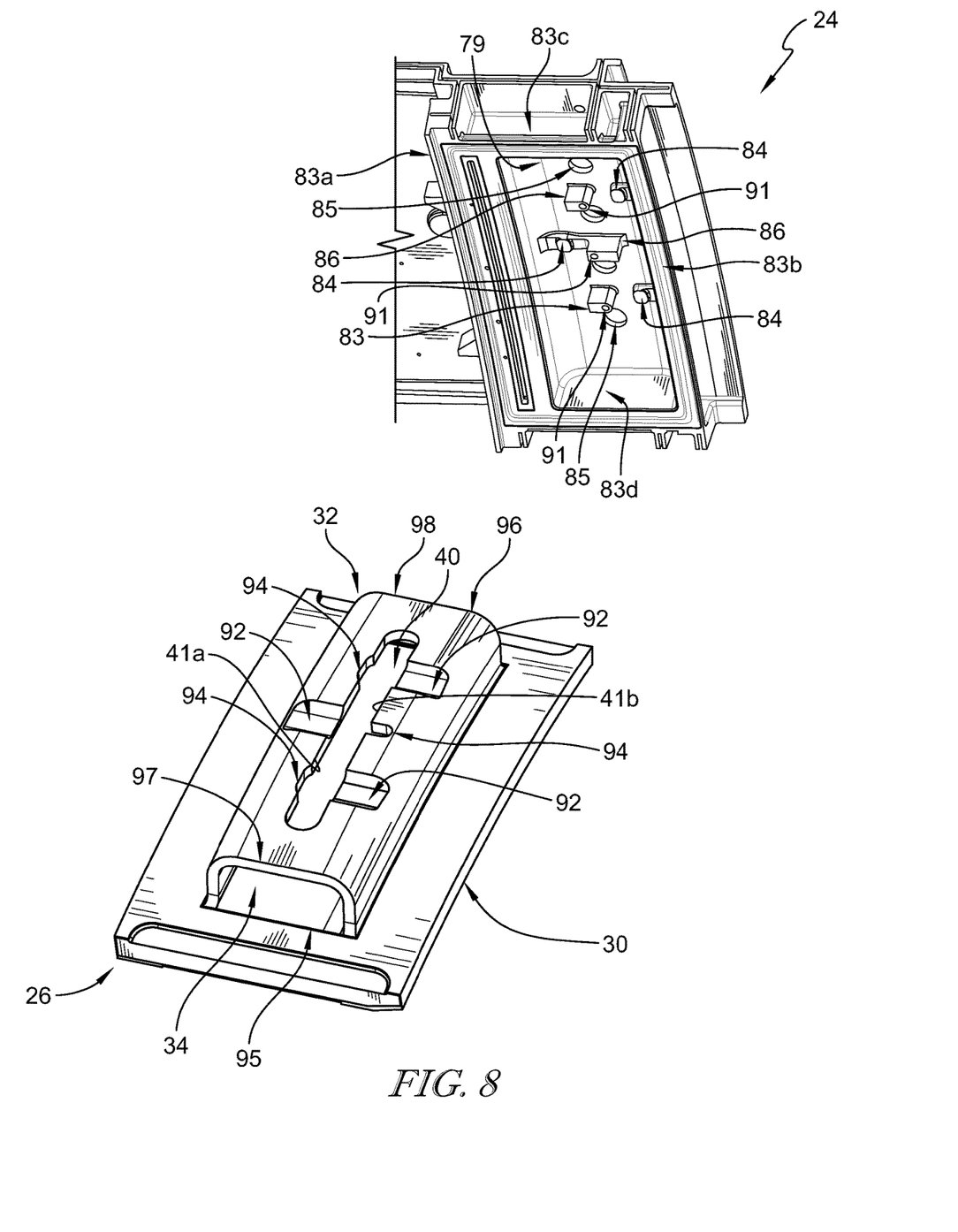
FIG. 8 is an isometric view of the carrier and CMC seal segment of the shroud assembly of FIG. 2 showing the blade track segment is shaped to include the circumferential hanger slot that extends circumferentially along a portion of a circumferential length of the blade track segment, axial stop slots spaced circumferentially apart along the circumferential length of the hanger slot that engage axial stop locators formed in the carrier to axially locate the blade track segment in the cavity, and location datum channels spaced apart along the circumferential length of the hanger slot that extend radially inward into the blade track segment and receive anti-rotation datum tabs formed in the carrier to block rotation of the blade track segment in the cavity.

The mount plate 82 is shaped to include a plurality of apertures 85 as shown in FIGS. 3, 4, and 8. The apertures 85 receive the shaft 48 of the hangers 42. In the illustrative embodiment, the threaded portion 49 of the shafts 48 extends through the apertures 85 radially outward of the mount plate 82.

The receiving walls 83a, 83b, 83c, 83d include a forward receiving wall 83a, an aft receiving wall 83b, a first axial receiving wall 83c, and a second axial receiving wall 83d as shown in FIGS. 3, 4, 6, and 8. The aft receiving wall 83b is spaced axially aft of the forward receiving wall 83a, and each of the forward and aft walls 83a, 83b extend circumferentially partway around the axis 11. The second axial receiving wall 83d is spaced circumferentially from the first axial receiving wall 83c. The first and second axial receiving walls 83c, 83d extend axially between and interconnect the forward and aft receiving walls 83a, 83b to form the attachment-receiving space 79.

The anti-rotation features 84, 86 include anti-rotation tabs 84 and axial stop locators 86 as shown in FIGS. 4 and 8. The anti-rotation tabs 84 extend radially inward from the mount plate 82 and engage corresponding features 92, 94 in the top wall 38 of the attachment box 32 to block rotation of the blade track segment 26 about the axis 11 relative to the carrier 24. The axial stop locators 86 extend radially inward from the mount panel 82 through the circumferentially-extending hanger slot 40 into the cavity 34. The axial stop locators 86 are spaced apart circumferentially in between adjacent hangers 42 and engage one of a forward side 41a and an aft side 41b of the slot 40 to block axial movement of the blade track segment 26 relative to the carrier 24.

In the illustrative embodiment, the carrier 24 is shaped to include at least three anti-rotation tabs 84. In other embodiments, the carrier 24 may be shaped to include less than three anti-rotation tabs. In some embodiments, the carrier 24 may be shaped to include more than three anti-rotation tabs 84.

The axial stop locators 86 are shaped to include cooling impingement holes 91 as shown in FIGS. 4 and 8. Each of the cooling impingement holes 91 extend radially through the axial stop locators 86 and align with the cooling apertures 65 formed in the shield panel 58. The cooling impingement holes 91 are configured to supply the cavity 34 with a flow of pressurized cooling air to cool the blade track segment 26 as well as the mounting assembly 28 within the cavity 34.

In some embodiments, the flow of pressurized cooling air pressurizes a pressure-controlled zone P or the cavity 34. The air supplied to the pressure-controlled zone P is at a higher pressure than that of the gasses in the flow path 23.

In the illustrative embodiments, the anti-rotation tabs 84 and the axial stop locators 86 are circumferentially spaced in between the hangers 42. The anti-rotation tabs 84 are axially aligned with the axial stop locators 86.

The anti-rotation tabs 84 and the axial stop locators 86 are axially aligned as shown in FIG. 8. In the illustrative embodiment, at least one of the anti-rotation tabs 84 is integral with the axial stop locator.

Turning again to the blade track segment 26, the top wall 38 of the blade track segment 26 is also shaped to include anti-rotation datums 92 and axial stop slots 94 as shown in FIG. 8. The anti-rotation datums 92 are radially-outwardly opening channels that open radially-outwardly toward the carrier 24 to receive the anti-rotation tabs 84. The axial stop slots 94 extend axially into one of the forward side 41a and the aft side 41b of the slot 40. In the illustrative embodiment, at least two axial stop slots 94 are arranged on one of the forward side 41a and the aft side 41b of the slot 40 and at least one axial stop 94 is arranged on the opposite side of the slot 40 from the at least two axial stop slots 94.

Figure 7:
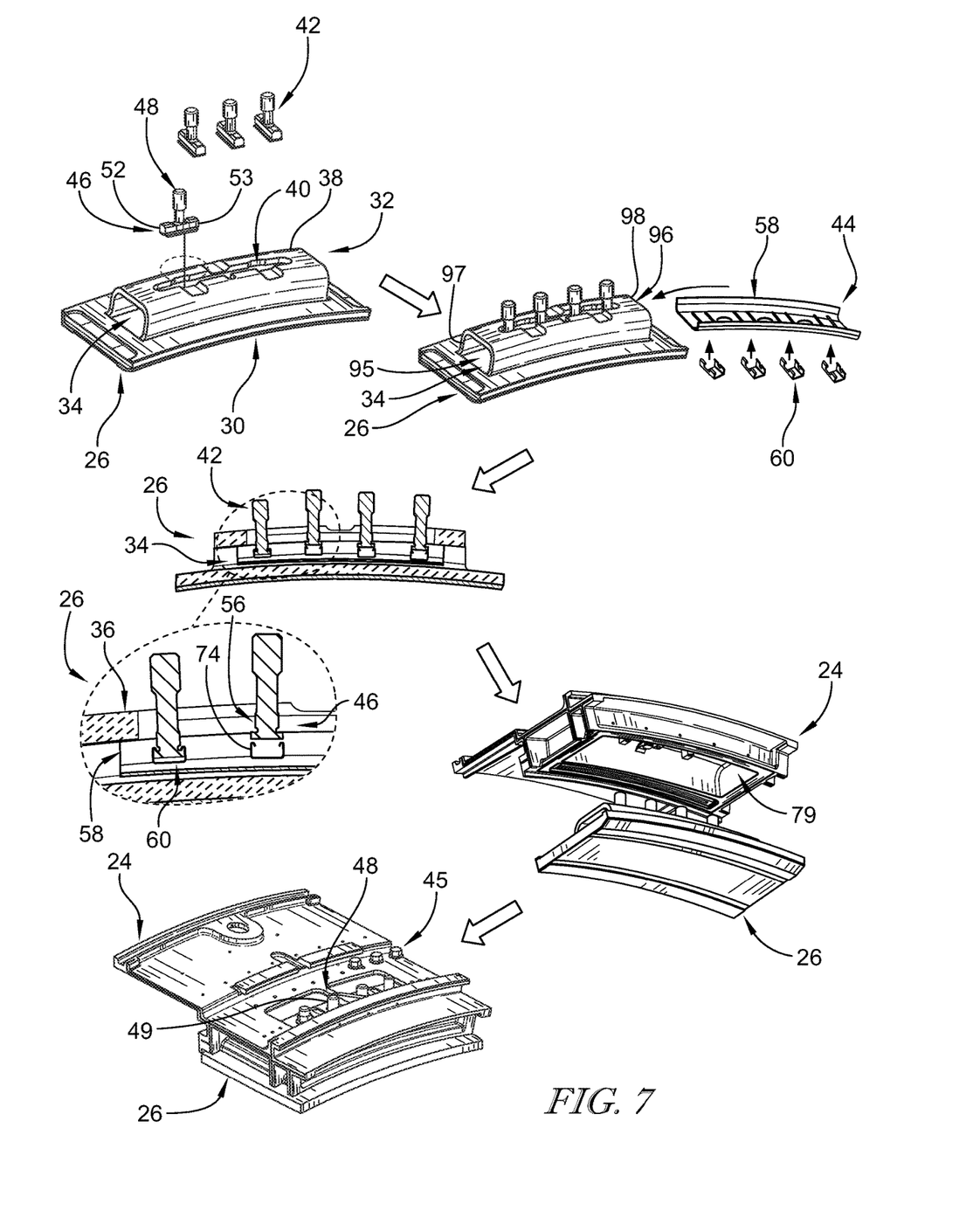

A method of assembling the turbine shroud segment 22 includes several steps as shown in FIG. 7. The method includes aligning the bracket 46 of the hanger 42 with circumferentially-extending slot 40 of the blade track segment 26 such that the bracket body 50 extends circumferentially and parallel with the slot 40. The method further includes inserting the bracket 46 of the hanger 42 into the cavity 34 of the blade track segment 26 through the circumferentially-extending slot 40, rotating the hanger 42 at least 90 degrees such that the bracket body 50 extends axially in the cavity 34 of the blade track segment 26 and the load pads 51 engage the attachment box 32. The method includes repeating these steps for each of the hangers 42.

The method further includes assembling the heat shield 44 by aligning the first and second clip arms 67, 68 with the corresponding clip slots 64a, 64b. The method includes inserting the first clip arm 67 into the first clip slot 64a and the second clip arm 68 into the adjacent second clip slot 64b.

The method further includes inserting the assembled heat shield 44 into the cavity 34 from one of a first or second circumferential opening 95, 96 on either circumferential side 97, 98 of the blade track segment 26. The method includes aligning each of the attachment clips 60 with the corresponding hanger 42 and attaching the heat shield 44 to each of the hangers 44. The attachment step includes pushing the bracket 46 radially inward so that the corresponding attachment clip 60 couples to the bracket 46 of each hanger 42. By pushing the bracket 46 radially inward into the attachment clip 60, the clip head 74 extends over the bracket body 50 and engages the clip notches 56. The method includes repeating the attachment step for each of the hangers 42.

The method includes inserting the threaded ends 49 of the hangers 42 through the apertures 93 in the carrier 24 so that the assembled blade track segment 26 is arranged in the attachment receiving space 79 of the carrier 24. The method also includes attaching the fastener nuts 45 to each of the threaded portions 49 of the hangers 42 by tightening the nuts 45 so that the blade track segment 26 is coupled to the carrier 24 and the load pads 51 directly engage the attachment box 32.

During the tightening step, the heat shield 44 is configured to resist torque applied to the hangers 42 caused by tightening the nuts 45. Therefore, the heat shield helps maintain the orientation of the hangers 42 keeping the hangers 42 axially aligned during the tightening step.

In some embodiments, the heat shield 44 acts as an assembly aid to help assemble the blade track segment 26 with the hangers 42 to the carrier 24. The method may further include disconnecting each of the hangers 42 from the heat shield 44 and removing the heat shield 44 from the cavity 34 once the tightening step is complete.

Figure 9:
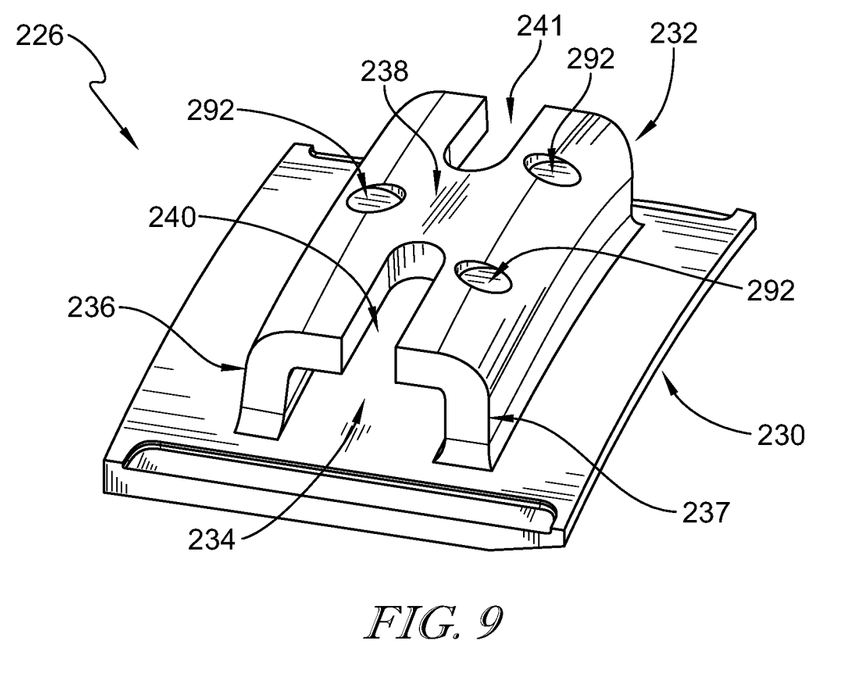
FIG. 9 is another embodiment of a blade track segment adapted to be included in the shroud assembly of FIG. 2 showing the blade track segment includes a runner that forms a flow surface of the gas path and an attachment box that extends radially outward from the runner for insertion into the cavity of the carrier, and showing the attachment box is shaped to include two circumferential hanger slots that extend each extend from one of the circumferential ends of the attachment box circumferentially inward partway along a circumferential length of the blade track segment.

Another embodiment of a turbine shroud assembly 222 in accordance with the present disclosure is shown in FIG. 9. The turbine shroud assembly 222 is substantially similar to the turbine shroud assembly 22 shown in FIGS. 1-8 and described herein. Accordingly, similar reference numbers in the 200 series indicate features that are common between the turbine shroud assembly 22 and the turbine shroud assembly 222. The description of the turbine shroud assembly 22 is incorporated by reference to apply to the turbine shroud assembly 222, except in instances when it conflicts with the specific description and the drawings of the turbine shroud assembly 222.

Each shroud segment 222 includes a carrier 24, a blade track segment 226, and a mounting assembly 28 as shown in FIG. 9. The blade track segment 226 comprises ceramic matrix composite materials and is arranged radially outward of the blades 15 and coupled to the carrier 24 by the mounting assembly 28.

The blade track segment 226 includes a runner 230 and an attachment feature 232 as shown in FIG. 9. The runner 230 extends partway around the central reference axis 11. The attachment feature 232 extends radially-outwardly from and circumferentially along the runner 230. In the illustrative embodiment, the attachment feature 232 is an attachment box 232 that cooperates with the runner 230 to define a cavity 234 immediately outward of the runner 230 in which a portion of the mounting assembly 28 is arranged.

The attachment box 232 includes an axially-forward wall 236, an axially-aft wall 237, and a top wall 238 as shown in FIG. 9. The axially-aft wall 237 is spaced axially aft of the axially-forward wall 236 relative to the central axis 11. The top wall 238 extends between and interconnects the axially-forward and axially-aft walls 236, 237 at a location radially outward from the runner 230 of the blade track segment 226. The arrangement of the walls 236, 237, 238 of the attachment box 232 creates a U-shape when viewed in the circumferential direction around the central axis 11.

The top wall 238 of the attachment box 232 is shaped to include a first circumferentially-extending hanger slot 240 and a second circumferentially-extending hanger slot 241 as shown in FIG. 9. The first circumferentially-extending hanger slot 240 extends circumferentially into the top wall 238 of the blade track segment 226 from a first circumferential end 297. The second circumferentially-extending hanger slot 241 extends circumferentially into the top wall 238 of the blade track segment 226 from a second circumferential end 298 circumferentially spaced apart from the first circumferential end 297. The first and second circumferentially-extending hanger slots 240, 241 allow for the installation of the mounting assembly 228 into the cavity 234, while also allowing a flow of cooling air to be supplied to the cavity 234 to cool the blade track segment 226.

Figure 10:
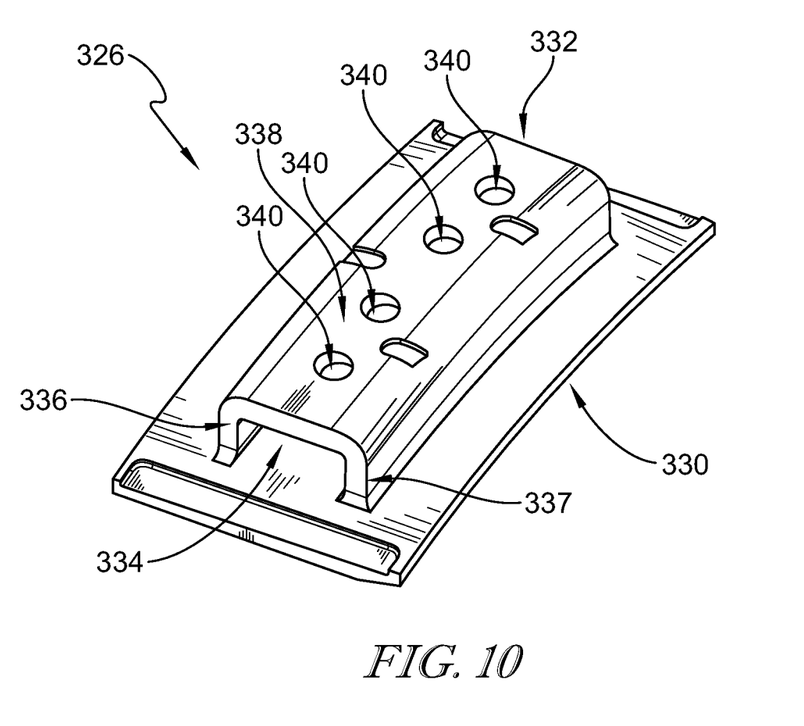
FIG. 10 is another embodiment of the blade track segment included in the shroud assembly of FIG. 2 showing the attachment box is shaped to include a plurality of hanger holes that extend radially through the attachment box of the blade track segment.

Another embodiment of a turbine shroud assembly 322 in accordance with the present disclosure is shown in FIG. 10. The turbine shroud assembly 322 is substantially similar to the turbine shroud assembly 22 shown in FIGS. 1-8 and described herein. Accordingly, similar reference numbers in the 300 series indicate features that are common between the turbine shroud assembly 22 and the turbine shroud assembly 222. The description of the turbine shroud assembly 22 is incorporated by reference to apply to the turbine shroud assembly 322, except in instances when it conflicts with the specific description and the drawings of the turbine shroud assembly 322.

Each shroud segment 322 includes a carrier 24, a blade track segment 326, and a mounting assembly 28 as shown in FIG. 10. The blade track segment 326 comprises ceramic matrix composite materials and is arranged radially outward of the blades 15 and coupled to the carrier 24 by the mounting assembly 28.

The blade track segment 326 includes a runner 330 and an attachment feature 332 as shown in FIG. 10. The runner 330 extends partway around the central reference axis 11. The attachment feature 332 extends radially-outwardly from and circumferentially along the runner 330. In the illustrative embodiment, the attachment feature 332 is an attachment box 332 that cooperates with the runner 330 to define a cavity 334 immediately outward of the runner 30 in which a portion of the mounting assembly 328 is arranged.

The attachment box 332 includes an axially-forward wall 336, an axially-aft wall 337, and a top wall 338 as shown in FIG. 10. The axially-aft wall 337 is spaced axially aft of the axially-forward wall 336 relative to the central axis 11. The top wall 338 extends between and interconnects the axially-forward and axially-aft walls 336, 337 at a location radially outward from the runner 330 of the blade track segment 326. The arrangement of the walls 336, 337, 338 of the attachment box 332 creates a U-shape when viewed in the circumferential direction around the central axis 11.

The top wall 338 of the attachment box 332 is shaped to include a plurality of hanger holes 340 as shown in FIG. 10. The plurality of hanger holes 340 radially extend through the top wall 338 of the attachment box 332. The plurality of hanger holes 340 are circumferentially spaced apart and allow for the installation of the mounting assembly 328 into the cavity 334.

The present disclosure teaches a mounting assembly 28 for a turbine shroud segment 22 to attach and cool the CMC seal segment 26 for use in the turbine section 18 of the gas turbine engine 10. The CMC material provides benefits in reduced cooling air needs and lighter weight, but attaching the CMC to the surrounding hardware 24 may be difficult due to large coefficient of thermal expansion differences between the CMC materials of the blade track segment 26 and the metallic materials of the carrier 24. Additionally, the sealing and attachment of the turbine shroud 22 may impact the stress state in the CMC seal segment 26, which is more sensitive to stresses due to the reduced mechanical properties when compared to metallic equivalents.

The seal segment 26 with the box shaped cross-section may have reduced bending stresses due to that naturally stiff U-shape. However, the box geometry 32 may be more susceptible to thermal stresses (i.e. the fight between hot central flow path region and cold attachment region and edges).

As such, the specified machined geometry in the attachment region 32 of the CMC segment 26 may help reduce the thermal stresses in two ways. The first way may be to remove material (where possible) in locations where the thermal gradients are largest. The second way may be to introduce a way to cool the hot section or runner 30 that formed the flow path 23 with cooling air. The present disclosure captures a preferred embodiment for attaching the box CMC segment 26 to the carrier 24.

In the illustrative embodiment of FIG. 7, the turbine shroud segment 22 is assembled by several steps. The first step includes orientating the hanger 42 in the slot 40 and inserting the hanger 42 into the slot 40. Once the hanger 42 is in the cavity 34 of the box 32, the method of assembling includes rotating or spinning the hanger 90 degrees so that the load pads 51 of the hanger 42 react against the inner top side 38 of the attachment box 32. The method also includes repeating these steps for the other hangers 42.

The second step of the assembly process includes inserting the heat shield 44 into the cavity 34, under the hangers 42. The heat shield 44 is a single component in some embodiments. In the illustrative embodiment, the heat shield is a two piece component.

The third step includes attaching the heat shield 44 onto each of the hangers 42. The attaching step includes pushing the hangers radially inward so that the heat shield 44 snaps onto each hanger 42.

The fourth step of the assembly process includes positioning the box seal segment 26 with the hangers 42 and the heat shield 44 into the attachment-receiving space 79 of the carrier 24. The fifth step includes attaching the fastening nuts 45 onto the shafts 48 of the hangers 42 by tightening the nuts 45.

The present disclosure also teaches that the heat shield 44 may be made from a single sheet metal component. The single sheet of metal may include holes 65 to allow the flow path laminate or runner 30 of the CMC blade track 26 to be cooled. In other embodiments, the heat shield 44 may include separate components 58, 60 that are assembled and fixed together.

In the illustrative embodiment, the blade track segment 26 is a 2D laminate construction with filler/noodles. In other embodiments, the blade track segment 26 may be constructed by a different way. The features 40, 92, 94 in the top wall 38 of the attachment box 32 may be machined. The circumferentially-extending or long center slot 40 may allow backside cooling of the segment 26, which may minimize thermal stresses while meeting functionality.

The attachment box 32 arrangement may also help maintain stiffness, which may reduce bending stresses where vertical walls 36, 37 and the runner 30 meet compared to other concepts. In the illustrative embodiments, the attachment box 32 of the segment 26 does not include any machining inside the cavity 34.

The seal segment locating features 84, 86 in the carrier 24 may be cast in place and ground to needed tolerances. Cooling holes 91 may be placed in the protrusions 84, 86 used as axial and anti-rotation features 86, 84. The mounting assembly 28 also allows for additional space to add further cooling holes if needed.

The turbine shroud segment 22 in the illustrative embodiments offers many benefits. The segment 22 may maintain stiffness of the box structure 32 and allow simple cooling of the blade track segment 26. The illustrative embodiments may also enable the use of less expensive, interstage cooling air.

All CMC datum contacts 92, 94 of the blade track segment 26 with the features 84, 86 of the carrier 24 may be machined faces. The use of the center slot 40 for axial stop may also eliminates need for machining an axial stop on the aft face 37 of box 32, thus, making the segment 26 easier to manufacture with fewer stress risers and less environmental exposure.

The center slot 40 may also leave the circumferential ends of the attachment box 32 tied together to lower stresses at the transition between the runner 30 and sides 36, 37 of the box 32 at the ends where stresses tend to concentrate. The center slot 32 may also allow access for impingement cooling in the middle of the runner 20 (i.e. where the blade track segment 26 needs cooled to manage thermal stress).

The central slot 40 of the attachment box 32 also allows for impingement air to be plumbed from multiple sources. The multiple sources may allow for a lower temperature and less parasitic air source to be used for impingement.

The central slot 40 may also reduce stress concentrations and/or machining costs. The central slot 40 may reduce stress concentrations and/or machining costs by allowing axial loads to be taken out on the forward and aft edges 41a, 41b of the slot 40.

The mounting assembly 28 may also eliminate the need for machining faces in the cavity (inside) 34 of the box 32. The eliminated need to additional machining inside the box 32 also simplifies the design further. The mounting assembly 28 may also avoid bending on bolted hangers, as the axial and circumferential loads are transferred directly to the carrier 24, not through the hangers 44. The mounting assembly 28 may also enable simpler attachment hardware (lower cost) and more contact point locations (reduced stress by spreading loads).

The turbine shroud segment 22 also may have reduced thermal stress. In a blade track segment with no back side impingement, the edges stay cool for the most part with a hot central region. The high thermal stresses may occur at the leading and trailing edges of the segment and may be a result of the hot center putting the cold edges in tension circumferentially.

In the illustrative embodiment, the segment 22 includes an added boundary condition of 3 cooling holes 91 impinging on the center of the seal segment 26. This reduces the peak temperature hot region and reduces the thermal gradient from center regions to the leading and trailing edges. The illustrative embodiment, the shroud segment 22 may also have a significant reduction in peak stress and volume of material under high stress.

Thermal studies on the impacts of geometry on the stresses in the attachment region 32, away from the flow path component 30, may show that the geometry and location of the machined features impact the peak stress values and the volume of material under stress (the amount the peak stress is concentrated). In some embodiments, advantages to different geometries depend on the flow path thermal profile after cooling is added. The circumferentially-extending slot 40 location may be where the temperature gradient between the flow path 23 and top of box 38 is greatest. Removing material here may allow the part to thermally grow more freely without building up large volumes of high thermal stress. However, leaving a continuous box cross section in 1 or more circumferential locations may be preferred to reduce the mechanical bending stresses.

In a single bolt hole design, material is removed in the best location (i.e. highest temperature difference between top of box 38 and flow path 23 is in this circumferential position). However, the attachment hardware design may be too complex with limited points of contact (i.e. 3 or 4).

In the illustrative embodiment of FIG. 10, four individual hangers, allowing individual "T" hooks to be used to attach the box section 332 is shown. If the box 332 were tall enough, the "T" hooks may be assembled from the inside 334 of the box 332, sticking the threaded portion 49 of the hanger 42 up through the attachment hole 340.

This embodiment may be an ideal solution if the space claim radially outward allows for a much taller box section 332. In some embodiments, a tall box section may also be beneficial for reducing stress levels.

In other embodiments where a shorter box is implemented, then the "T" hooks 42 may be a two piece assembly. A cross piece 46 with the load pads 51 may be placed within the inside 334 of the box 332. The threaded stud portion 48 of the "T" hook may then be inserted into the cavity 34 through the hole 340 in the CMC box 332, and attached to the cross piece 46 inside the cavity 334 of the box 332.

The two piece "T" hanger arrangement may eliminate inherent stress concentration at the transition between the shaft 48 and the cross-piece portion 46 of the "T" shape. By "pre-cracking" the piece 42, load is not transferred in this area such that there is no stress concentration.

The two-piece hanger arrangement may also allow for the hook 42 to accommodate misalignment tolerances and/or relative movement during operation of the gas turbine engine 10. The two-piece hanger may also allows for these tolerances without the tendency to tip the nut 45 up on one side, which may result in losing sealing and load transfer.

The two-piece hanger arrangement may also lower the cost of the hangers 42. The individual pieces may result in less scrap and less machining time. In some embodiments, a threaded joint may help reduce the cost of the hanger components 42 since the extra piece limited to one and the added features are simple, low cost threads.

The connection between the bracket 46 and the shaft 48 may be a threaded joint in some embodiments, In other embodiments, the shaft 48 may be extended through the cross piece 46 and capturing the shaft 48 in place with a retaining ring, or by other such means. In other embodiments, the bracket 46 and the shaft 48 may have a cross pin pressed through the end of the shaft 48 that may rest in a semi-circular cradle on the underside of the bracket 46.

In some embodiments, the hangers 42 may be shaped to include the cooling impingement holes 91 as suggested in FIGS. 6 and 6A. The cooling impingement holes 91 may extend radially through the shaft 48 of each hanger 42 to manage the temperature of the hangers 42 and improve the lift and/or enable lower cost materials. The cooling impingement holes 91 in the hangers 42 may also be configured to provide a flow of cooling air to the blade track segment to manage the thermal stresses in the ceramic matrix composite material of the blade track 26. The flow of cooling air on the backside of the runner 30 lowers the thermal stresses in areas of high thermal stress, i.e. along the leading edge or tailing edge.

However, the embodiment of FIG. 10 may not allow for interstage cooling air impingement in the middle of the box section 332. Additionally, the segment 22 may have additional machined surfaces on the aft surface to act as an axial stop.

In embodiments that do not remove material where the thermal difference is greatest, in the middle of the part, a result may be that the peak stresses are relatively high with an appreciable amount of stressed volume. The attachment box 32 as shown in FIGS. 3-6, the peak stresses may still be relatively high, however, it is an exceedingly concentrated stress at the internal edge at the ends of the slot. This type of concentrated stress is expected to be much less of a concern than a larger stress field at a lower peak stress value.

In some embodiments, the turbine section 18 adapted for use in the gas turbine engine 10 may include the turbine case 17, the turbine wheel 13, and the turbine shroud 20 as shown in FIGS. 1 and 2. The turbine case 17 may extend around the central reference axis 11 and the turbine wheel 13 may be mounted in the turbine case 17 for rotation about the central reference axis 11. The turbine shroud 20 may provide the ring around the turbine wheel 13 that defines the primary gas path 23 to discourage movement of gasses past the turbine wheel 13 without interacting with turbine blades 15 of the turbine wheel 13.

In some embodiments, the turbine wheel 13 may include the turbine blades 15 that are shaped to interact with hot gasses as they expand along the primary gas 23 path. The blades 15 may cause rotation of the turbine wheel 13 about the central reference axis 11.

In some embodiments, the turbine shroud 20 may be made up of turbine shroud segments 22 that each include the carrier 24, the blade track segment 26, and the mounting assembly 28. The carrier 24 may be made from metallic materials and may be coupled to the turbine case 17. The blade track segment 26 may be made from ceramic matrix composite materials. The segment 26 may be shaped to include the runner 30 that extends partway around the central reference axis 11 to define in-part the primary gas path 23 and the attachment box 32 that extends radially-outwardly from the runner to define the cavity 34 therebetween.

The mounting assembly may include at least one hanger 42 and the heat shield 44. The hanger 42 may have the bracket 46 that engages the attachment feature 32 of the blade track segment 26 and the shaft 48 that extends through the aperture 49 in the carrier 24. The heat shield 44 may be coupled to the bracket 46 of the hanger 42

In some embodiments, the heat shield may have the shield panel 58. The shield panel 58 may be arranged radially between the runner 30 of the blade track segment 26 and the bracket 46 to resist the transmission of heat from the runner 30 to the bracket 46.

In some embodiments, the attachment box 32 may include the axially-forward wall 36, the axially-aft wall 37, and the top wall 38. The top wall 38 may interconnect the axially-forward wall 36 and the axially-aft wall 37 at a location spaced radially outward from the runner 30 of the blade track segment 26 so that the attachment box 32 creates a U-shape when viewed in the circumferential direction around the central reference axis 11.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud segment adapted to extend part-way around a turbine wheel in a gas turbine engine, the turbine shroud segment comprising
a carrier made from metallic materials and adapted to be coupled to a turbine case,
a blade track segment made from ceramic matrix composite materials, the blade track segment shaped to include a runner that extends partway around a central reference axis to define in-part a primary gas path and an attachment feature that extends radially-outwardly from the runner, and
a mounting assembly configured to couple the blade track segment to the carrier, the mounting assembly including (i) at least one hanger with a bracket that engages the attachment feature of the blade track segment and a shaft that extends through an aperture in the carrier, and (ii) a heat shield coupled to the bracket of the hanger and having a shield panel arranged radially between the runner of the blade track segment and the bracket to resist the transmission of heat from the runner to the bracket.

2. The turbine shroud segment of claim 1, wherein the mounting assembly includes a plurality of hangers each having a bracket that engages the attachment feature of the blade track segment and a shaft that extends through an aperture in the carrier, and wherein the shield panel of the heat shield is arranged radially between the runner and the brackets of each of the plurality of hangers to resist the transmission of heat from the runner to the brackets of each of the plurality of hangers.

3. The turbine shroud segment of claim 2, wherein the heat shield includes a plurality of attachment clips that extend from the heat shield to engage with the brackets of each of the plurality of hangers and couple the heat shield to the brackets of each of the plurality of hangers.

4. The turbine shroud segment of claim 3, wherein the attachment feature of the blade track segment is an attachment box that cooperates to define a cavity immediately outward of the runner in which the brackets of each of the plurality of hangers and the heat shield are arranged.

5. The turbine shroud segment of claim 1, wherein the mounting assembly includes at least one nut that engages threads formed on the shaft of the hanger.

6. The turbine shroud of claim 1, wherein the mounting assembly includes a plurality of hangers each having a bracket that engages the attachment feature of the blade track segment and a shaft that extends through an aperture in the carrier, and wherein the mounting assembly includes a plurality of nuts that each engage threads formed on the shaft of each of the hangers.

7. The turbine shroud segment of claim 6, wherein the shield panel of the heat shield is arranged radially between the runner and the brackets of each of the plurality of hangers to resist the transmission of heat from the runner to the brackets of each of the plurality of hangers.

8. The turbine shroud segment of claim 7, wherein the heat shield includes a plurality of attachment clips that extend from the heat shield to engage with the brackets of each of the plurality of hangers and couple the heat shield to the brackets of each of the plurality of hangers.

9. The turbine shroud segment of claim 1, wherein the attachment feature of the blade track segment is an attachment box that cooperates with the runner of the blade track segment to define a cavity immediately outward of the runner in which the bracket of the at least one hanger and the heat shield are arranged.

10. The turbine shroud segment of claim 9, wherein the attachment box includes an axially-forward wall, an axially-aft wall, and a top wall that interconnects the axially-forward wall and the axially-aft wall at a location spaced radially outward from the runner of the blade track segment so that the attachment box creates a U-shape when viewed in the circumferential direction around the central reference axis.

11. The turbine shroud segment of claim 10, wherein the mounting assembly includes a plurality of hangers each having a bracket arranged in the cavity that engages the attachment box of the blade track segment and a shaft that extends through the top wall of the attachment box and through the carrier.

12. The turbine shroud segment of claim 11, wherein the shield panel of the heat shield is arranged radially between the runner and the brackets of each of the plurality of hangers to resist the transmission of heat from the runner to the brackets of each of the plurality of hangers.

13. The turbine shroud segment of claim 11, wherein the mounting assembly includes a plurality of nuts that each engage threads formed on the shaft of each of the hangers.

14. The turbine shroud segment of claim 11, wherein the bracket of each of the plurality of hangers extends axially forward and aft of the shaft such that the bracket and the shaft of each hanger cooperate to provide a T-shape when viewed in the circumferential direction around the central reference axis.

15. The turbine shroud segment of claim 11, wherein the shaft of each of the plurality of hangers is shaped to include a cooling impingement hole that extends radially through the shaft and is configured to provide a flow of cooling air to the blade track segment.

16. A turbine shroud segment adapted to extend part-way around a turbine wheel in a gas turbine engine, the turbine shroud segment comprising
a carrier adapted to be coupled to a turbine case,
a blade track segment that extends partway around a central reference axis to define in-part a primary gas path, and
a mounting assembly configured to couple the blade track segment to the carrier, the mounting assembly including a first hanger and a second hanger spaced apart circumferentially from the first hanger,
wherein each of the first hanger and the second hanger is T-shaped and includes a bracket engaged with the blade track segment and a shaft that extends radially outward from the bracket through an aperture in the carrier, and wherein the mounting assembly further includes a heat shield coupled to the bracket of the first hanger and to the bracket of the second hanger to block removal of the first hanger and the second hanger from the blade track segment.

17. The turbine shroud of claim 16, wherein the blade track segment is shaped to include a circumferentially-extending hanger slot that extends circumferentially partway about the central reference axis, the shaft of the first hanger and the shaft of the second hanger extend through the hanger slot, and wherein the black track segment engages the first hanger and the second hanger to block radially inward movement of the blade track segment relative to the carrier.

18. The turbine shroud of claim 16, wherein the shaft of each hanger is shaped to include a cooling impingement hole that extends radially through the shaft and is configured to provide a flow of cooling air to the blade track segment.

19. A method of assembling a turbine shroud segment, the method comprising providing a carrier segment that is shaped to define an attachment-receiving space, providing a blade track segment that includes a runner that extends partway around a central reference axis and an attachment box that extends radially-outwardly from the runner to define a cavity immediately outward of the runner, providing a mounting assembly that includes (i) at least one hanger with a bracket and a shaft that extends radially outward from the bracket, (ii) a heat shield having a shield panel and an attachment clip configured to couple to the at least one hanger, and (iii) a nut configured to couple to the shaft of the at least one hanger, aligning the bracket of the at least one hanger with a circumferentially-extending hanger slot formed in the attachment box of the blade track segment by orientating the bracket such that the bracket extends circumferentially and parallel with the circumferentially-extending hanger slot, inserting the bracket of the at least one hanger through the circumferentially-extending hanger slot into the cavity of the blade track segment such that the bracket is located in the cavity and a threaded portion of the shaft extends radially outward of the attachment box, rotating the at least one hanger 90 degrees within the cavity so that the bracket extends axially and perpendicular to the circumferentially-extending slot and engages the attachment box to block removal the at least one hanger out of the cavity, inserting the heat shield into the cavity from one of a first or second circumferential opening on either circumferential side of the blade track segment so that the shield panel of the heat shield is arranged radially between the bracket of the at least one hanger and the runner of the blade track segment, attaching the heat shield to the at least one hanger by pushing the hanger radially inward into engagement with the attachment clip so that the attachment clip couples to the bracket of the at least one hanger, positioning the attachment box of the blade track segment in the attachment-receiving space of the carrier segment such that the shaft of the at least one hanger extends through an aperture formed in the carrier segment, and attaching the nut to the threaded portion of the shaft radially outward of the attachment box so as to couple the blade track segment to the carrier segment.

* * * * *